(12) United States Patent
Dyson

(10) Patent No.: US 11,246,294 B2
(45) Date of Patent: Feb. 15, 2022

(54) ROTATABLE HORSE LIFTING AND SUPPORTING DEVICE

(71) Applicant: Donald Jennings Dyson, Escondido, CA (US)

(72) Inventor: Donald Jennings Dyson, Escondido, CA (US)

(*) Notice: Subject to any disclaimer, the term of this patent is extended or adjusted under 35 U.S.C. 154(b) by 294 days.

(21) Appl. No.: 15/987,874

(22) Filed: May 23, 2018

(65) Prior Publication Data

US 2018/0263216 A1 Sep. 20, 2018

Related U.S. Application Data

(63) Continuation-in-part of application No. 14/834,351, filed on Aug. 24, 2015, now abandoned.

(60) Provisional application No. 62/070,599, filed on Aug. 29, 2014.

(51) Int. Cl.
| | | |
|---|---|---|
| *A01K 15/04* | (2006.01) | |
| *A61D 3/00* | (2006.01) | |
| *A01K 1/06* | (2006.01) | |
| *A01K 15/00* | (2006.01) | |

(52) U.S. Cl.
CPC .............. *A01K 15/04* (2013.01); *A01K 1/06* (2013.01); *A01K 15/00* (2013.01); *A61D 3/00* (2013.01); *A61H 2203/03* (2013.01)

(58) Field of Classification Search
CPC .... A01K 15/04; A01K 15/023; A01K 1/0613; A01K 27/002

USPC ................. 119/417, 752, 728, 725, 712, 843
See application file for complete search history.

(56) References Cited

U.S. PATENT DOCUMENTS

| | | | | | |
|---|---|---|---|---|---|
| 438,360 | A | * | 10/1890 | Phelps | B68B 1/14 54/72 |
| 540,069 | A | * | 5/1895 | Morgan | A01K 15/02 54/72 |
| 678,117 | A | * | 7/1901 | Koch | A61D 3/00 119/728 |
| 3,312,195 | A | * | 4/1967 | Rohena | A01K 15/027 119/701 |
| 3,719,024 | A | * | 3/1973 | Searl | B68C 1/14 54/44.1 |
| 4,130,091 | A | * | 12/1978 | Knudson | A01K 15/027 119/701 |
| 4,266,508 | A | * | 5/1981 | McNulty | A01K 15/027 119/703 |
| 4,571,758 | A | * | 2/1986 | Samuelsson | A61G 7/1019 4/460 |
| 4,709,695 | A | * | 12/1987 | Kohn | A61F 9/04 128/858 |
| 4,907,571 | A | * | 3/1990 | Futakami | A61H 3/008 482/69 |
| 4,973,044 | A | * | 11/1990 | Jones | A61H 3/008 482/51 |
| 7,240,375 | B2 | * | 7/2007 | Martz | A41B 9/002 2/406 |

(Continued)

*Primary Examiner* — Brady W Frazier

(57) ABSTRACT

A four-legged animal lifter. Lifting straps extend downward from a rotatable horse support structure. Four harnesses are connected to the lifting straps and are attached to the legs of the four-legged animal. A lifting apparatus is attached to the rotatable horse structure and is for lifting the four-legged animal upwards to reduce weight on the animal's legs. In preferred embodiment the four-legged animal is a horse.

4 Claims, 17 Drawing Sheets

(56) References Cited

U.S. PATENT DOCUMENTS

| | | | | |
|---|---|---|---|---|
| 8,881,732 B2* | 11/2014 | Blurton | ................. | A61F 5/37 |
| | | | | 128/845 |
| 2010/0006038 A1* | 1/2010 | Matui | ................. | A01K 15/027 |
| | | | | 119/725 |
| 2010/0326366 A1* | 12/2010 | Park | ................. | A01K 15/027 |
| | | | | 119/700 |
| 2012/0024237 A1* | 2/2012 | Rice | ................. | A01K 15/027 |
| | | | | 119/703 |
| 2012/0037089 A1* | 2/2012 | Puhi | ................. | A61D 3/00 |
| | | | | 119/725 |

* cited by examiner

ROTATABLE HORSE LIFTING AND SUPPORTING DEVICE

The present invention relates to horse lifting devices, and in particular to lifting devices for injured horses. The present application is a Continuation-in-Part (CIP) of U.S. application Ser. No. 14/834,351, filed Aug. 24, 2015; which claims the benefit of Provisional Application 62/070,599 filed Aug. 29, 2014, both of which are incorporated by reference herein.

BACKGROUND OF THE INVENTION

There is no effective system of lift and support which reduces the weight felt on a horse's lower leg segments, including hooves, during an extended rehabilitation process. Indeed, horses who have broken a leg are euthanized approximately 95 percent of the time. Often the horse is euthanized because of severe laminitis. Large contributing factors for euthanizing the horse also include too much weight on the injured legs and hooves and not allowing proper time for healing.

Prior art methods of attempted relieving of weight from lower legs and hooves have not been proven effective. Currently the horse must stand erect, and weight taken from one healing limb is almost always shifted to one or more of the other legs. The lifting points on the horse are not effective and do not provide the horse the mobility to walk on their own during the extended rehabilitation process.

What is needed is an effective horse lifting device to reduce pressure on the horse's broken leg as well as the other three of the horse's legs during long term rehabilitation during long term rehabilitation.

SUMMARY OF THE INVENTION

The present invention provides a four-legged animal lifter. Lifting straps extend downward from a rotatable horse support structure. Four harnesses are connected to the lifting straps and are attached to upper legs of the four-legged animal. A lifting apparatus is attached to the rotatable horse structure and is for lifting the four-legged animal upwards to reduce weight on the animal's legs. In a preferred embodiment the lifting apparatus includes a hydraulic lifter for lifting the rotatable horse support structure and four independently controllable winches for independently lifting each of the four-legged animal's legs. In preferred embodiment the four-legged animal is a horse.

DETAILED DESCRIPTION OF THE PREFERRED EMBODIMENTS

The present invention utilizes four harnesses, one for each of the four legs of a horse. One harness attaches to each of the two forelegs and one harness attaches to each of the two rear legs. These harnesses are positioned at the upper part of each leg, providing the most optimum lifting and supporting areas for long-term rehabilitation, which can be days and weeks. These are the strongest areas of the legs and yet allow the horse to move its legs forward and back while walking about, exercising legs and all body parts during long-term rehabilitation periods. Moreover, an equine veterinarian may examine each leg regularly for rubbing and chafing. This person may also examine the lifting and supporting weights on each leg to insure proper balance for complete body healing.

Please note that the harnesses may be of a variety of materials such that they are strong, durable, washable, pliable, and suitable to the various horses' bodies. Also, each may have linings, to be in direct contact with the horse's skin, of soft materials allowing the easy flow of blood along and through veins and arteries which may run close to the surface of the horse's legs. Sheepskin, or synthetic fleeces, or any appropriate, approved lining materials may be used for a particular horse, given the time frame necessary for rehabilitation from particular diseases or injuries. What is needed is a "good fit" against a horse's skin for comfort, and to eliminate sores, shock, and rubbing.

Figure 2:
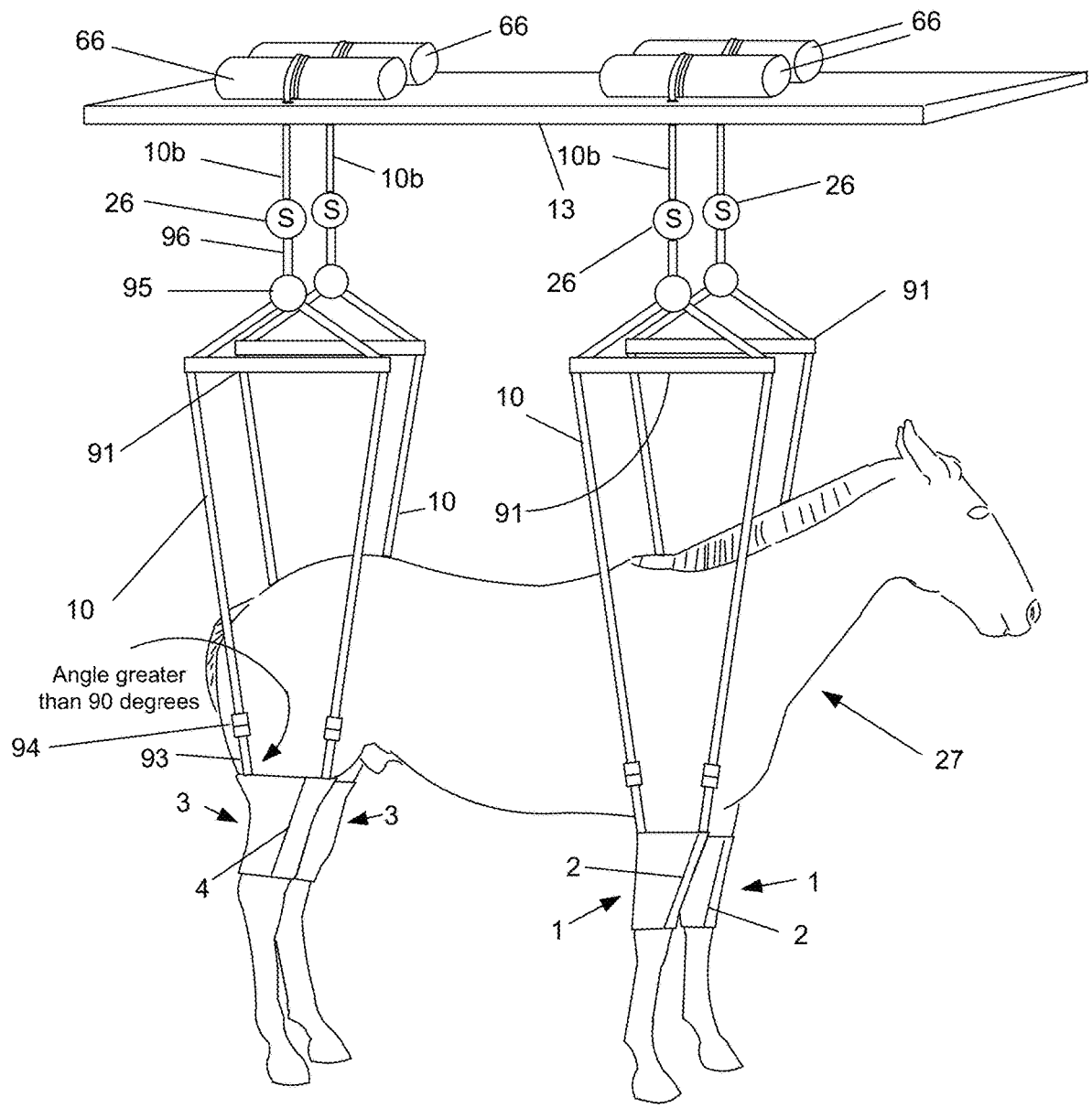
FIG. 2 shows a side view of a horse with harnesses attached.

For example FIG. 2 shows foreleg harnesses 1 and rear leg harnesses 3 attached to horse 27. In a preferred embodiment, the four harnesses are appropriately positioned for optimum lifting and rehabilitation. Each foreleg harness 1 is preferably positioned between the top of the knee joint, also known as carpuses, to the bottom of the elbow joint. Given the specific injury to the horse, and the multitude of other considerations in the healing process, the majority of the lifting in these two foreleg is preferably between the areas from the elbow joint to approximately 6-8 inches below the elbow joint. Or as recommended by equine veterinarians and other trained horse professionals.

Each rear leg harness 3 is preferably positioned from the top of the taruses, also known as hock joint, to the stifle joint. Likewise, given the specific injury to the horse, and the multitude of other considerations in the healing process, the majority of the lifting in the two rear legs is preferably between the areas from the stifle joint to approximately 6-8 inches below the stifle joint. Or as recommended by equine veterinarians and other trained horse professionals.

Figure 1:
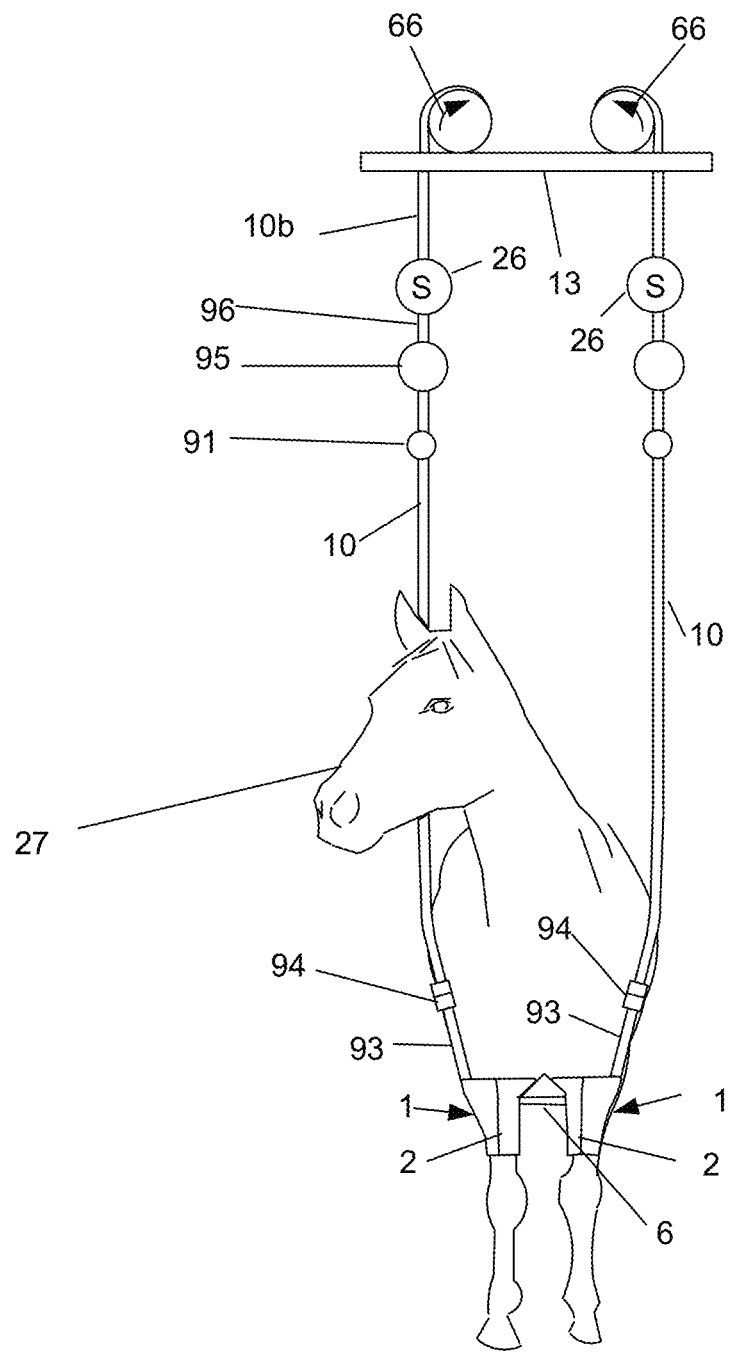
FIG. 1 shows a front view of a horse with harnesses attached.
Figure 3:
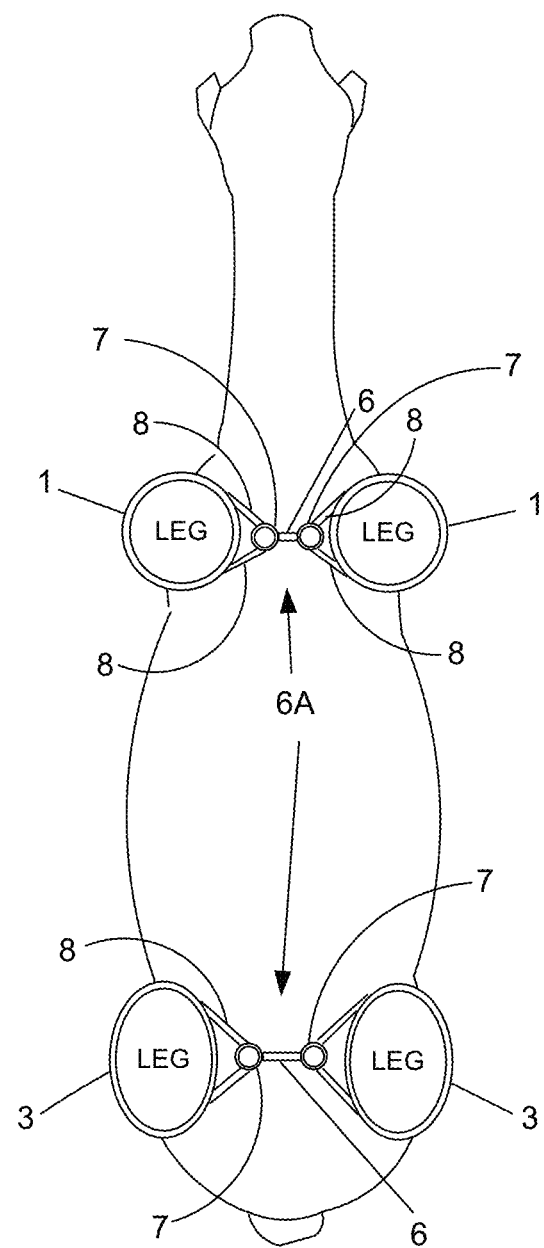
FIG. 3 shows a bottom view of a horse with harnesses attached.

FIGS. 1 and 2 show a preferred embodiment of the present invention. Foreleg harnesses 1 are connected to the forelegs of the horse via VELCRO® hook and loop fastener 2. Rear leg harnesses 3 are connected to the rear legs via hook and loop fastener 4. Strap 6 (FIG. 1) is connected between right foreleg harness 1 and left foreleg harness 1 and between rear leg harness right harness 3 and rear leg left harness 3 to prevent spreading of the legs (see also FIG. 3).

Underbody strap connection mechanism 6A also includes buckles 7 and connection straps 8.

Figure 14:
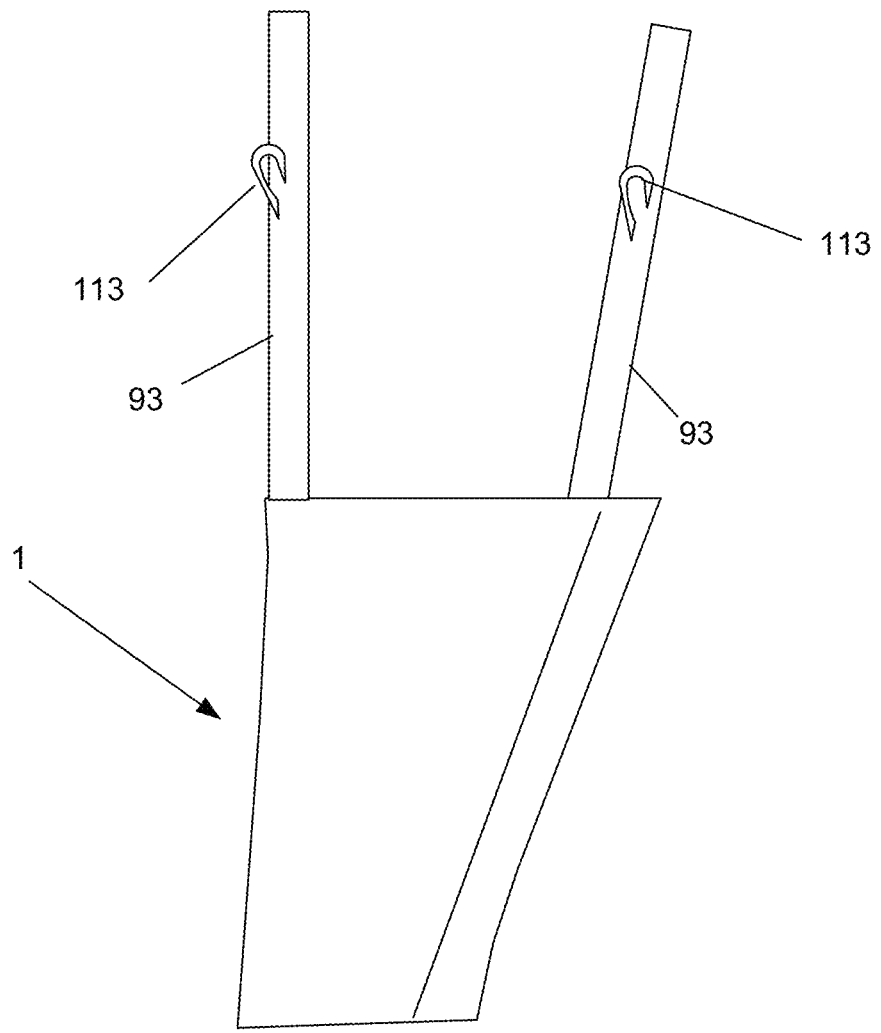
FIG. 14 shows a preferred leg harness.

Lifting straps 10 (FIGS. 1 and 2) are connected to harness connection straps 93 by utilizing metal connectors 94. FIG. 14 shows a detailed view of lift loops 113 sewn into connection straps 93 of harness 1. Metal connectors connected to straps 10 connect to lift loops 113. Lifting straps 10 are guided through spreader bar 91 as shown. Spreader bars 91 increase the angle of lifting straps 10 as they extend upwards from harnesses 3 and 1. The angles of the lifting straps 10 are no longer approximately perpendicular. Instead they are greater than 90 degrees. This allows for optimum lift of the horse's legs, more effective support of the horse and better rehabilitation.

Scales 26 are connected to the stranded wire ropes of the winches, which wind around the winches, as shown. The readings are preferable in pounds and may be read on centrally located instruments. The remote controlled, electrical winches 66 are connected to the top of overhead 13. Stranded wire ropes wind around winches 66.

Lifting straps 10 are connected to strap guide 95. Strap 96 extends upward from strap guide 95 and is connected to scale 26 Remote controlled electrical winches 66 are connected to the top of overhead 13. Wire winch lines 10b are wound around winches 66, as shown. The tension on straps 10 can increase or decrease by engaging winches 66. The amount of force (weight) is recorded through scales 26.

Figure 4:
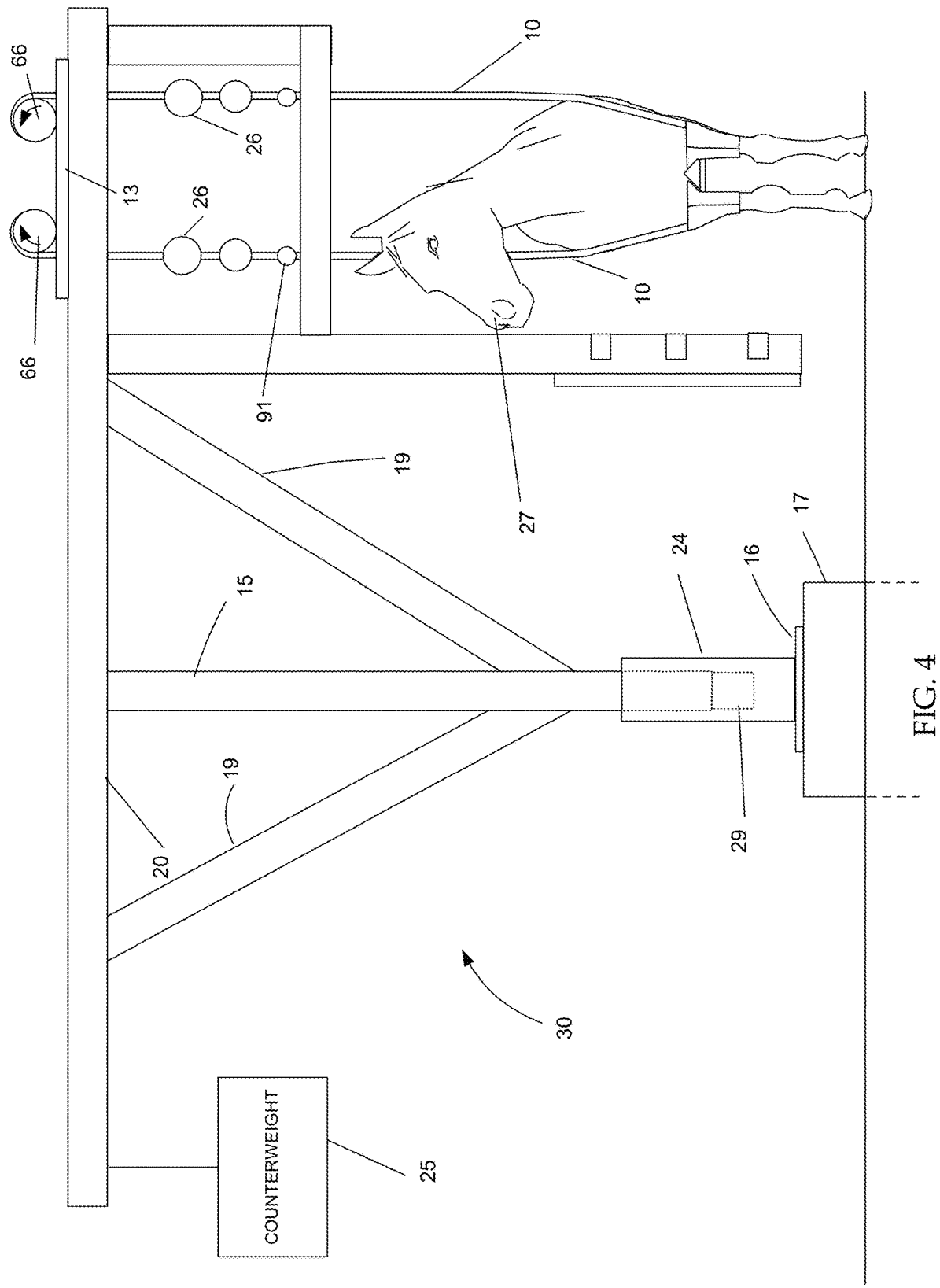
FIG. 4 shows a preferred rotatable horse lifter.

FIG. 4 shows a front view of horse 27 connected to preferred rotatable horse lifter 30. Support pole 15 is positioned above hydraulic lifter 29 (inside lifter casing 24). In a preferred embodiment hydraulic lifter 29 is a hydraulic cylinder lifter capable of lifting 6000 pounds a vertical distance of 10 inches and is manufactured by Miller Fluid Power with offices in Bensenville, Ill. (part no. HV350R2B-00400-01000-0175-97). Hydraulic lifter 29 is rigidly mounted on rotatable disc 16. Rotatable disc 16 allows for 360 degree rotation of horse lifter 30. Rotatable disc 16 is mounted onto concrete mounting base 17. Support beams 19 provide stability and support for horizontal support beam 20. Counterweight 25 is connected to the left side of beam 20 and balances the weight of horse 26.

Figure 5:
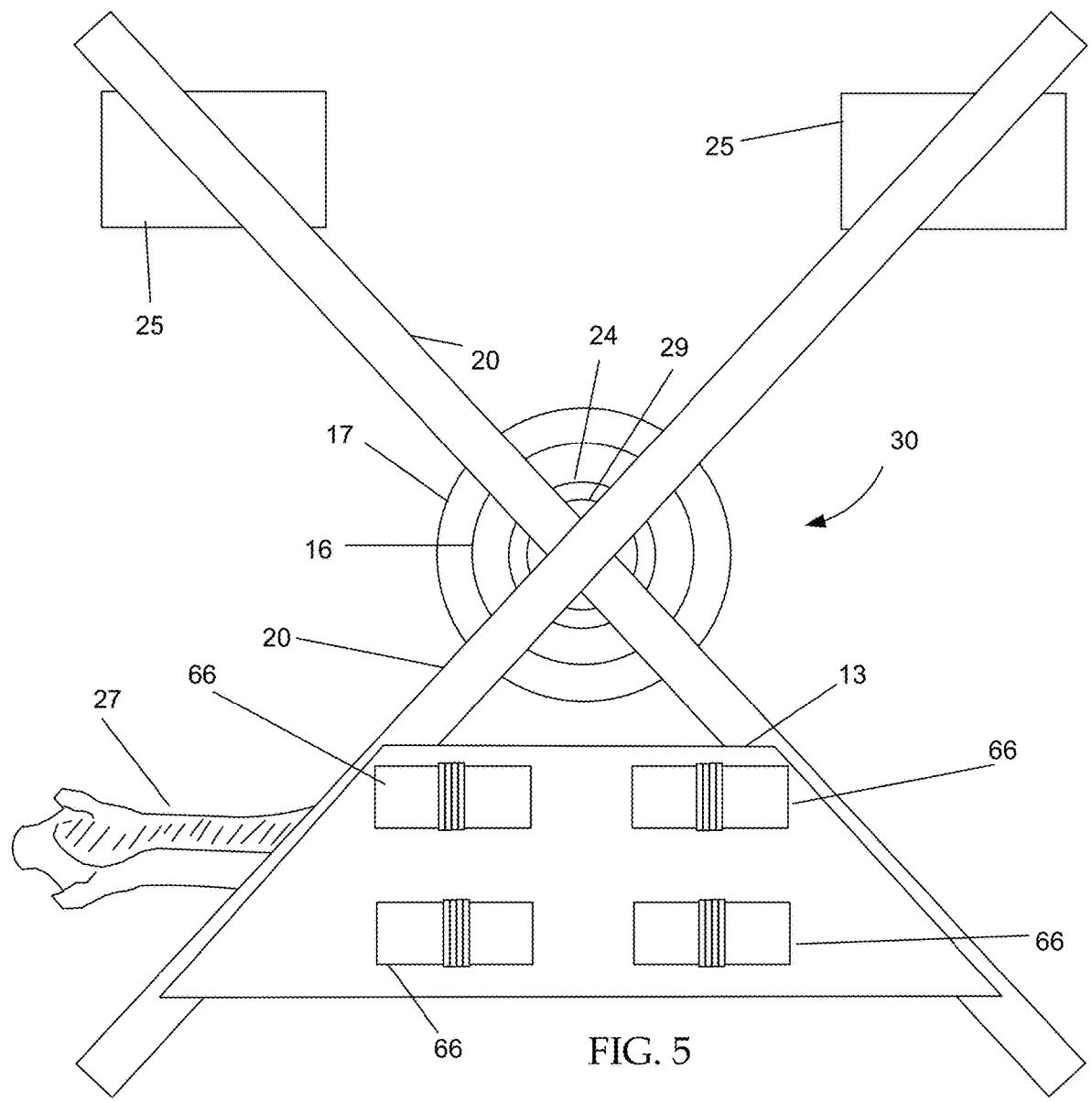
FIG. 5 shows a top view of a preferred rotatable horse lifter.

FIG. 5 shows a top view of horse lifter 30. Horse 27 is supported by overhead support 13 connected to beams 20. Horse lifter 30 is raised and lowered via hydraulic lifter 29 as explained above.

Figure 6:
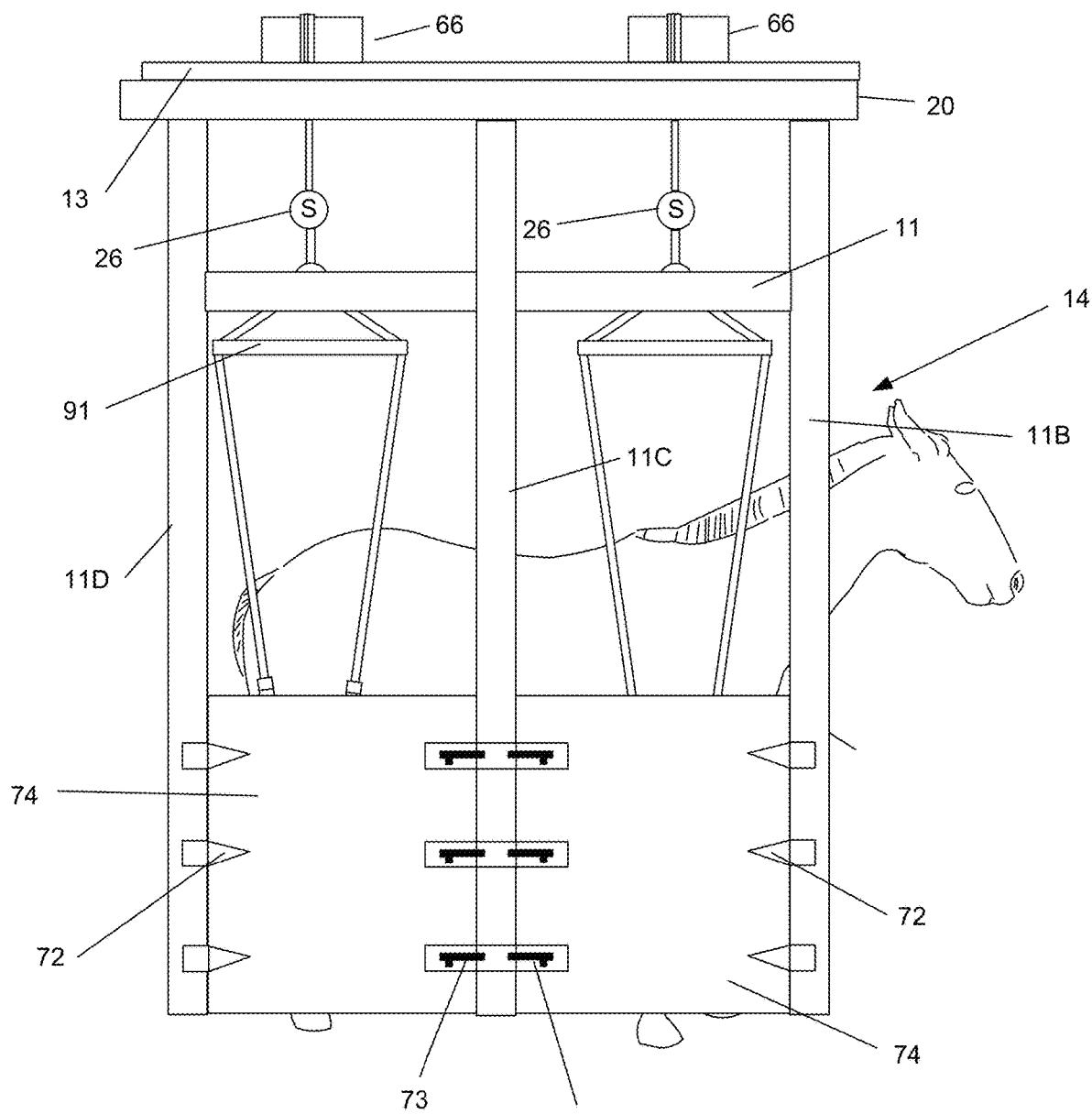
FIG. 6 shows a side view of a preferred containment stall.

FIG. 6 shows preferred containment stall 14. Containment stall 14 is connected to the bottom of support beams 20. Containment stall 14 contains horse 27 so that it is more comfortable and less likely to become highly agitated. Containment stall 14 includes vertical support beams 11B-11G, horizontal support beam 11 and doors 74 (see also FIGS. 11-12). Doors 74 are connected to vertical support beams 11B-11G via hinges 72 and are bolted shut by bolts 73.

Figure 7:
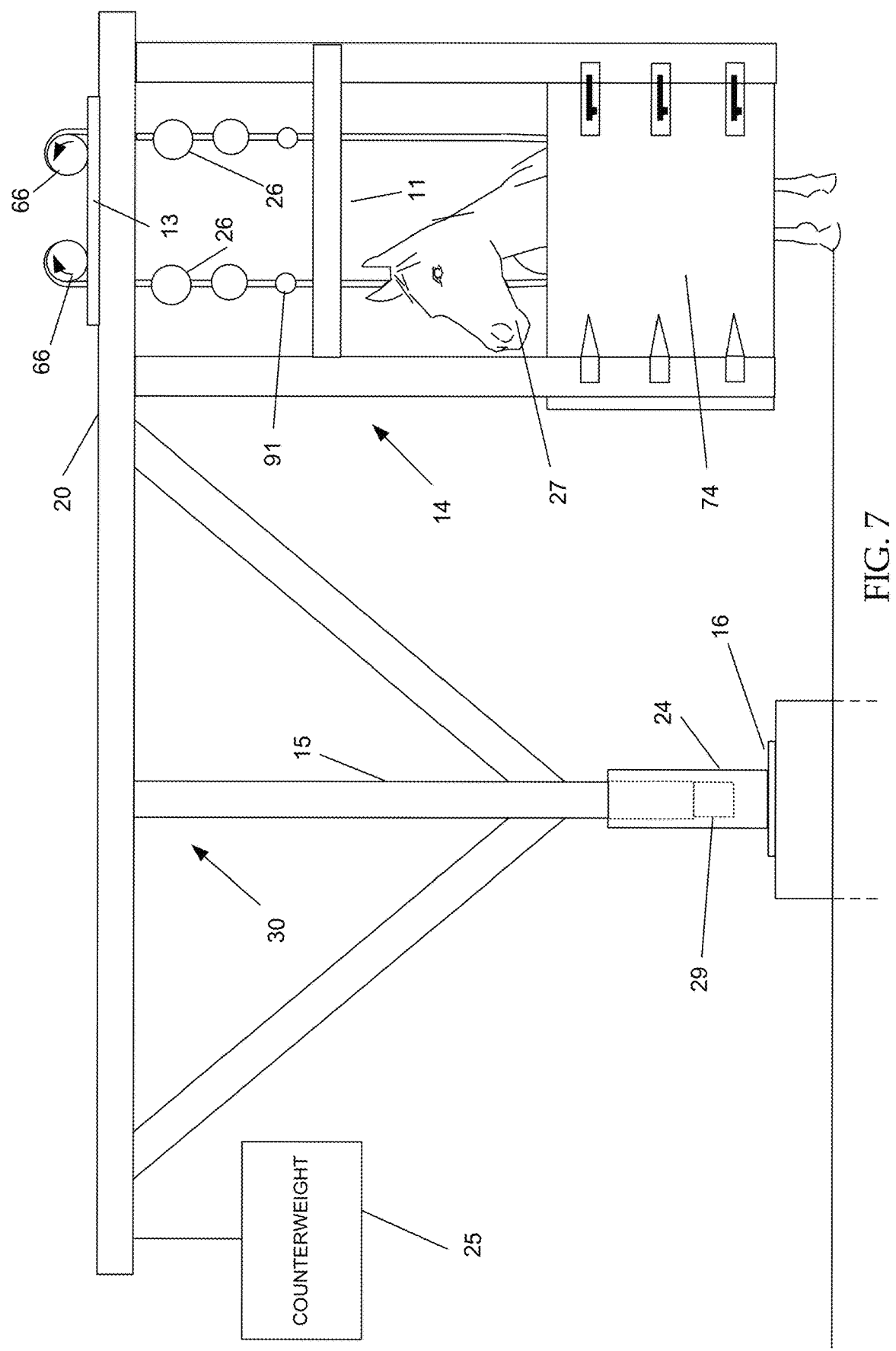
FIG. 7 shows a front view of a preferred containment stall.
Figure 8:
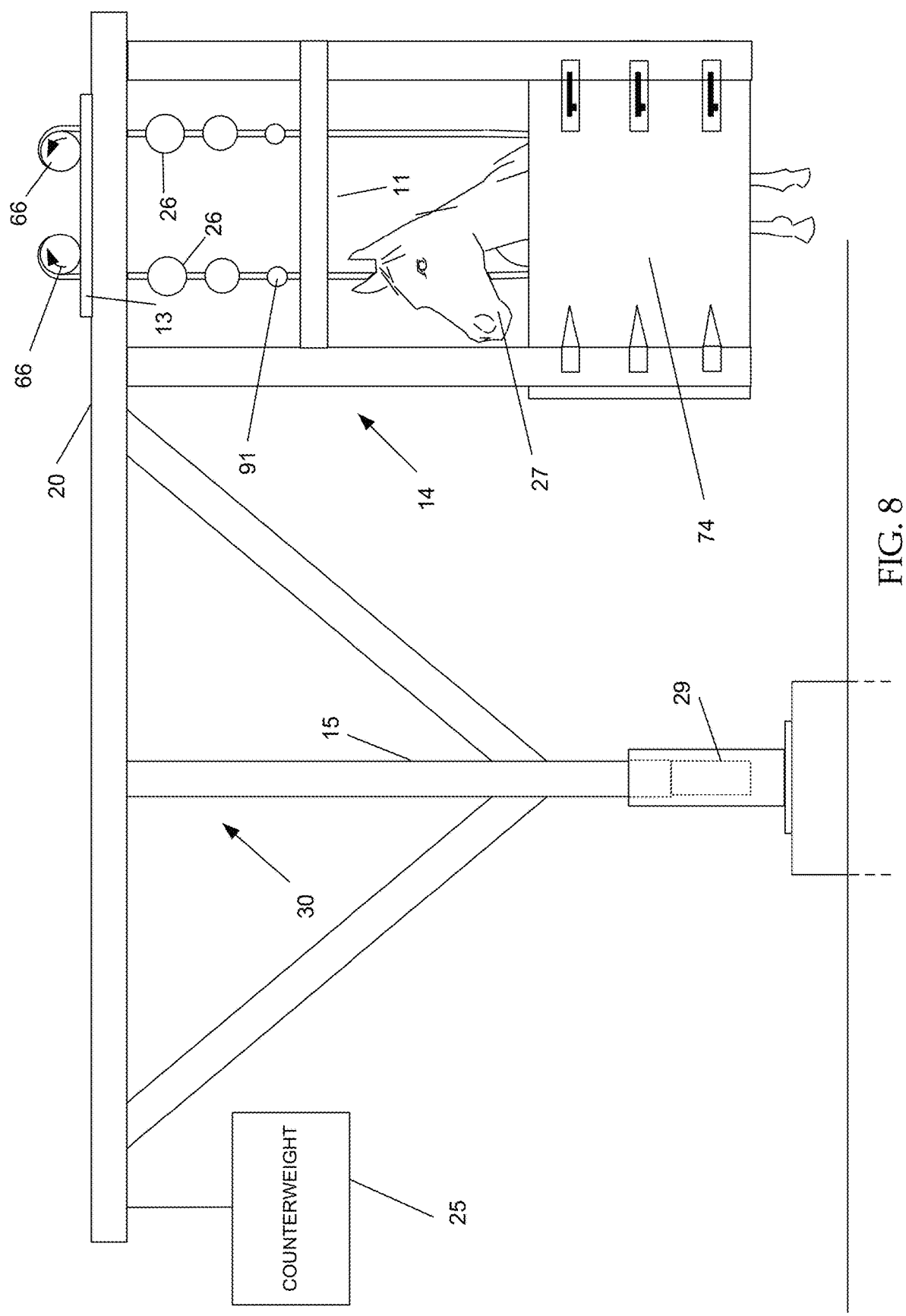
FIG. 8 shows a front view of a preferred containment stall.

FIG. 7 shows a front view of a preferred embodiment containment stall 14 connected directly to support beam 20. In FIG. 7 hydraulic lifter 29 has lifted support pole 15 upwards so that the horse only has to support just 15 percent of his weight with his legs. If necessary support pole 15 can be moved upwards higher so that the horse is suspended in air so that his legs can be completely rested (see FIG. 8).

Figure 9:
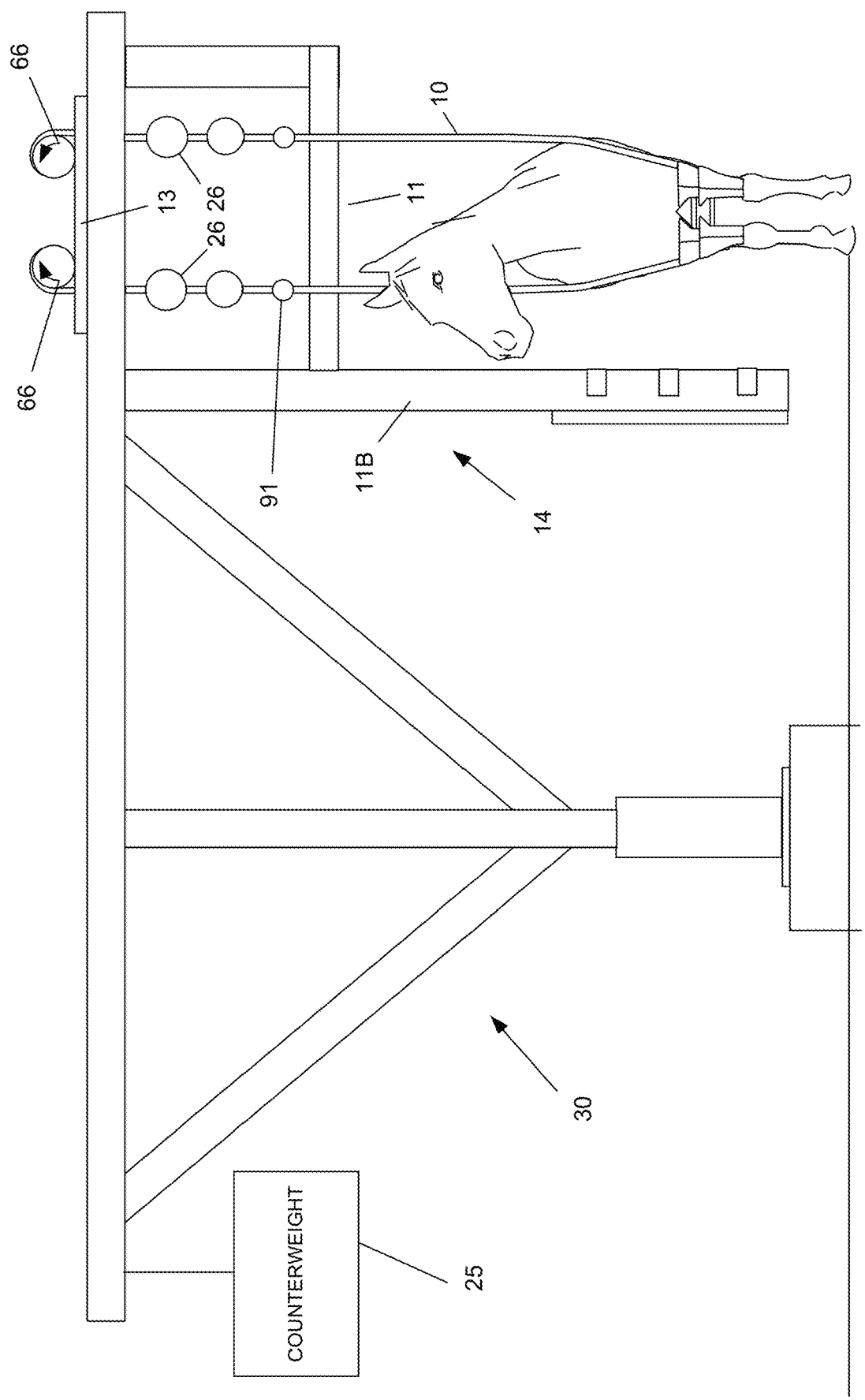
FIG. 9 shows a preferred containment stall with removed doors.

In a preferred embodiment, it is also possible to remove portions of containment stall 14 as the horse begins to mend and to allow easier access to the horse for treatment (see FIG. 9).

Preferred Method of Utilizing the Horse Lifter

Before attaching a horse to horse lifter 30, the horse is preferably casted (to treat the injury) sedated to relax the horse. Then foreleg harnesses 1 and rear leg harnesses 3 are attached to the horse's legs in a fashion similar to that described above (see FIG. 2). The horse is then connected to horse lifter 30. The horse should then appear as shown in FIG. 9. The user then utilizes remotely controlled winches 66 to bring lifting straps 10 taut.

Figure 12:
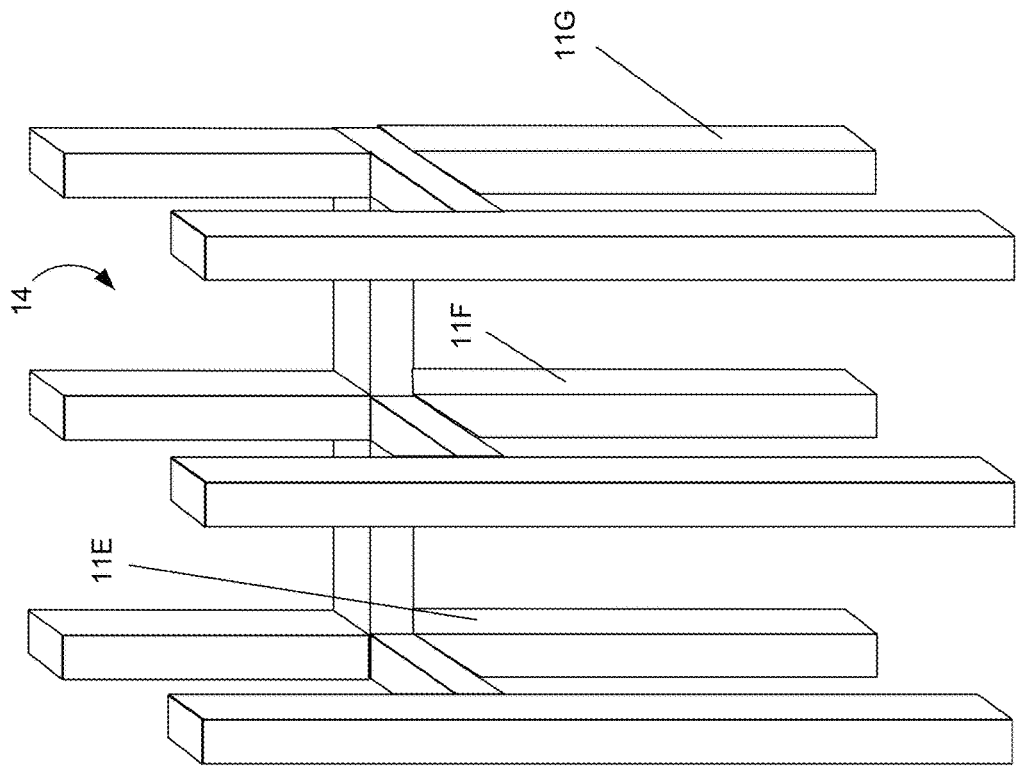
FIGS. 11-12 show preferred framing for the containment stall.
Figure 11:
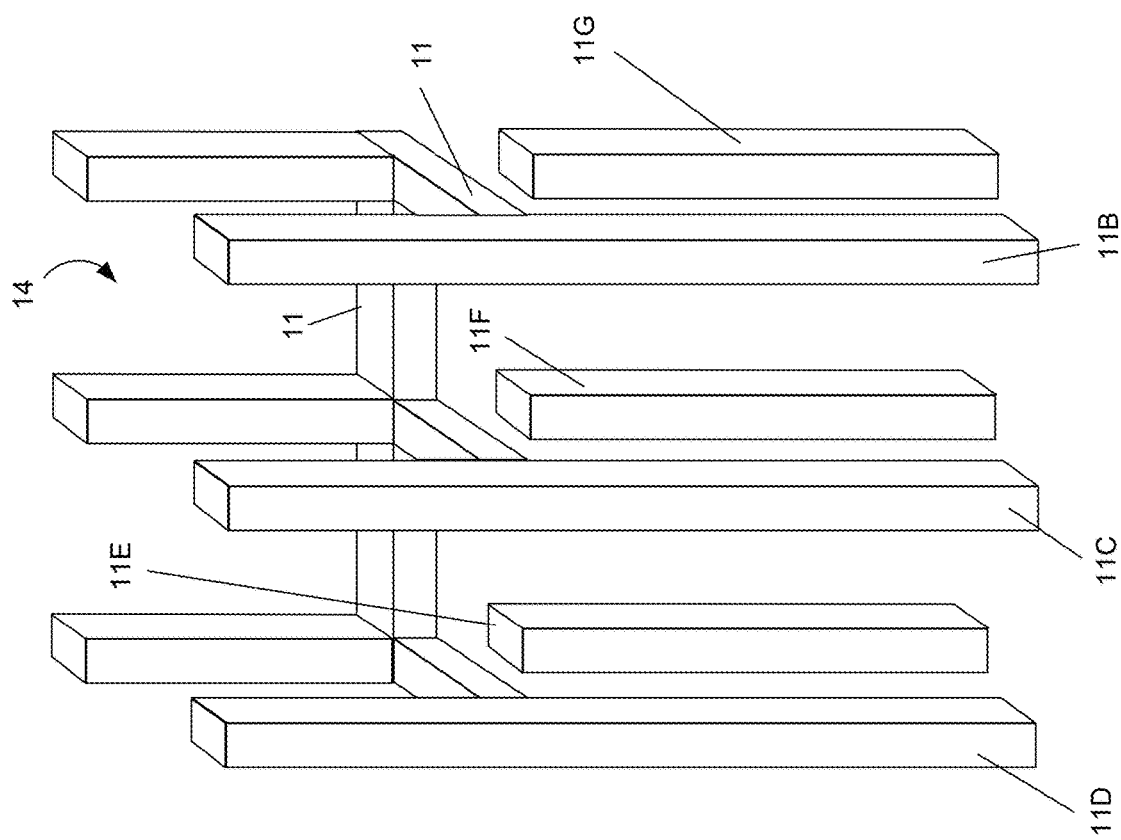

The user the contains the horse further by installing the remaining portions of containment stall 14 around horse 27 so that the horse is contained as shown in FIGS. 6 and 7. To do this, the user rigidly bolts temporary framing beams 11E, 11F and 11G to containment stall 14, as shown in FIGS. 11 and 12. Beams 11E-11G have an upper part which slides up into receiving areas in containment stall 14. For each temporary framing beam 11E-11G, there are preferably two bolt holes in containment stall 14 which line up precisely with beam 11E-11G bolt holes to allow bolts to be put through and washers and nuts applied.

Figure 13:
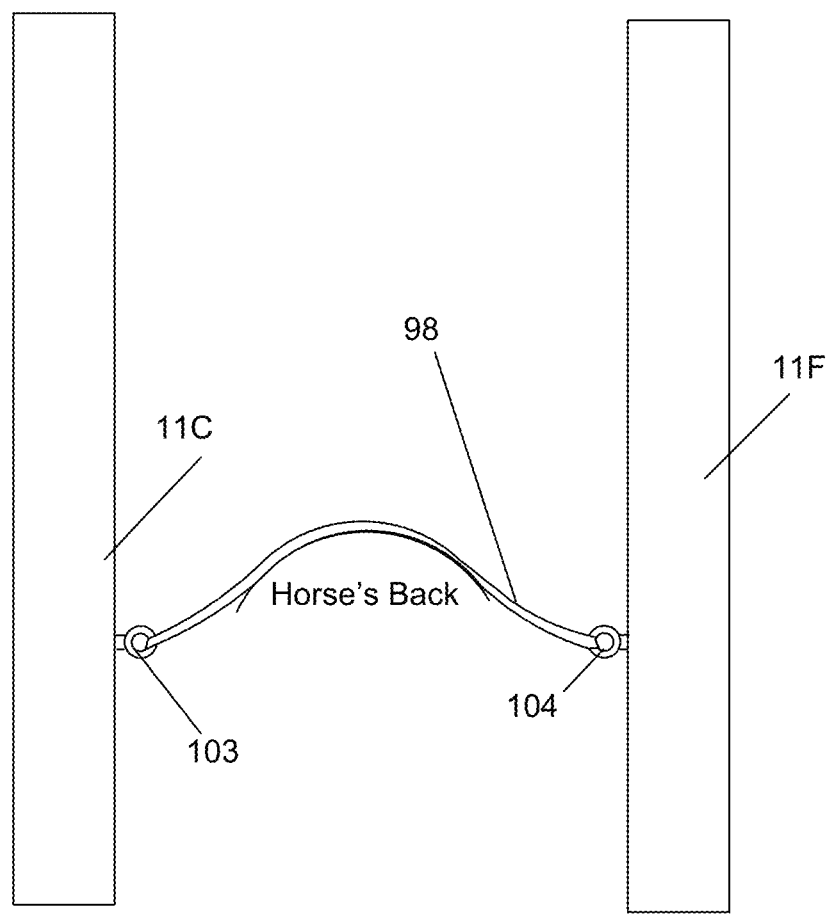
FIG. 13 shows a preferred leg harness.

After the beams are installed the user may apply restraining strap 98 (FIG. 13) across the horse's back. Retaining strap 98 functions to help hold the horse in place and prevent him from rearing up or jumping while connected to horse lifter 30. Restraining straps 98 are connected to beams 11C and 11F, as shown. Alternatively, multiple restraining straps 98 may be connected across the horse's back as preferred to properly restrain the horse. Restraining straps 98 may be connected to any of beams 11A-11G as preferred. After beams 11E-11G are installed, the user then installs doors 74 to contain the horse in containment stall 14.

Then the user utilizes hydraulic lifter 29 to lift the horse the desire amount so that that the appropriate amount of weight is carried on each hoof. For example, in one preferred embodiment horse 27 weighs 1200 pounds. The horse veterinarian wishes for ⅓ of the horse's weight to remain on the horse's legs and hooves. Therefore the user utilizes hydraulic lifter 29 and all winches 66 to lift 800 pounds. The user will know he has lifted 800 pounds by referring to scales 26 and adding the weight indicated on each scale. The scales will indicate 200 pounds each.

Alternatively, the user can customize how much weight is felt at each hoof by adjusting each winch 66 independently as preferred. In one example, the user first utilizes forward winches 66 to provided 80 pounds of upward force on the left leg and 120 pounds of upward force on the right leg. Then the user utilizes hydraulic lifter 29 to provide upward force so that rear scales 26 indicate 150 each, the right front scale 26 indicates 270 pounds and the left front scale indicates 230 pounds.

After he is contained in containment stall 14 the horse is now able to stand comfortably on his legs as he is rehabilitated. Additionally, as part of the rehabilitation process, the horse can walk forward in a circular fashion around the axis of provided by rotatable disc 16 (FIG. 7). As the horse heals the weight felt on each hoof can gradually be increased. Additionally portions of containment stall 14 can gradually be removed as horse 27 heals and becomes more relaxed (FIG. 9).

Preferred Control Connectivity

Figure 10:
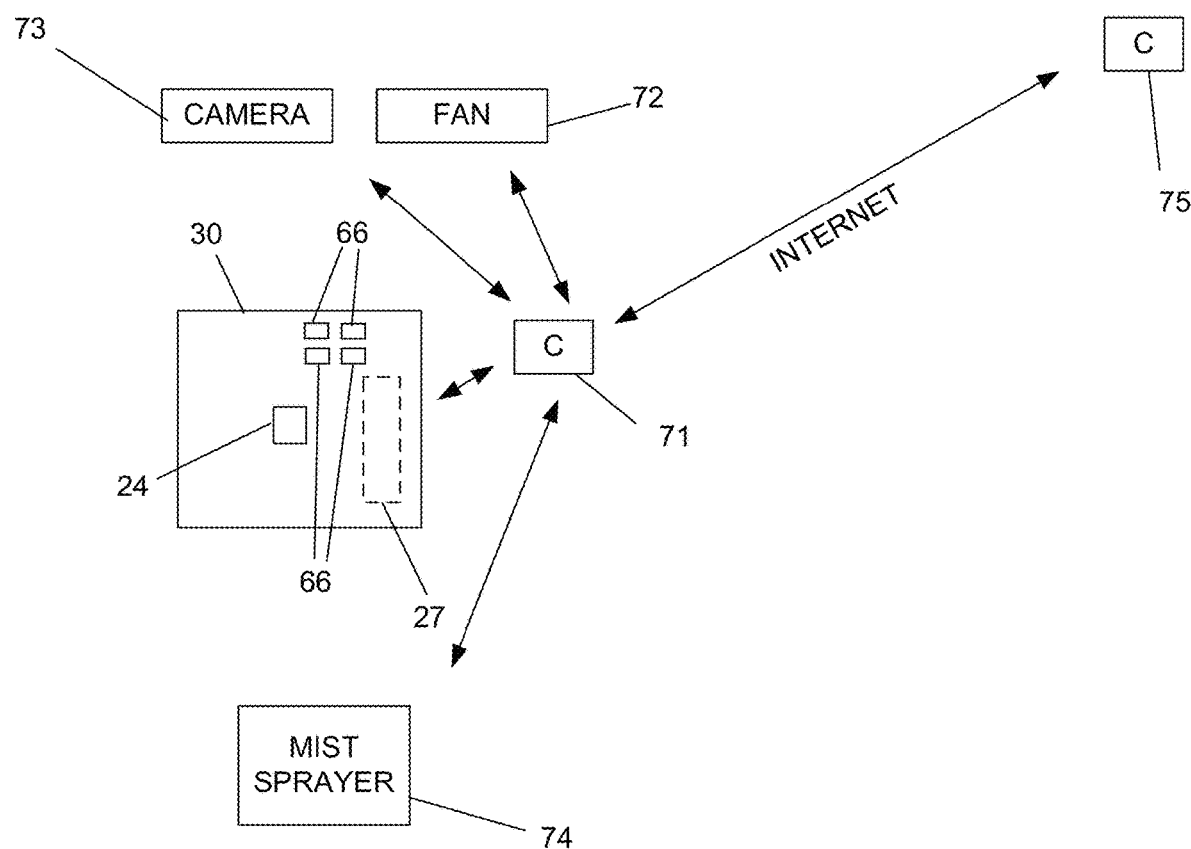
FIG. 10 shows a preferred control connectivity arrangement.

FIG. 10 shows preferred control connectivity for horse lifter 30. In FIG. 10, horse 27 is connected to horse lifter 30 in a manner as described above. Hydraulic lifter 29 and winches 66 are connected via a WIFI wireless network (or via wire connectivity) to control computer 71. Monitor camera 73, cooling fan 72 and mist sprayer 74 are also similarly connected to control computer. Therefore, a user at computer 71 can monitor and control all aspects of horse lifter 30 and the surrounding components. Also, in a preferred embodiment remote control computer 71 is connected to control computer 71 via a computer network, such as the Internet. Through computer 75, horse 27 may be carefully monitored and controlled. For example, a veterinarian remotely located at computer 75 can monitor horse 27, raise and lower hydraulic lifter 29 and winches 66 as appropriate for the horse's care and control the surrounding components.

A progression of information from mainframe computer to onsite "phablets" such as those manufactured by LG (GW990), Nokia (Nh10), Verizon Streak, & Samsung Galaxy Note, allows users to properly and professionally program computer control systems for horse lifter 30.

Software programming allows for long-term rehab programs for specific equine injuries or diseases, recommendations as to the breed, age, gender, size, past medical history, spirit, service history, for example.

Preferably, a computer control system will control:
the weight on each of the horses four hooves individually, and automatically program each weight with changes to be made as the rehab process unfolds,
a record of movement of the horse around horse lifter 30; that is, stops, starts, average walking speed, times at the water trough, at the feed bins,
every moment of the horses' time on the horse lifter with capability to change angles,
control over the administration of medicines that might be auto-fed into the horse, and/or mist sprays for insect or general health, air-distributed, ambient information,
body temperature, breathing patters, energy levels,
in addition, any information wanted by the equine veterinarian or other equine professional.

In another preferred embodiment, horse lifter 30 may be one of many horse lifters closely placed near one another where all climates can be computer controlled and monitored. Within this structure, individual horse lifters might have individual enclosures to more specifically monitor and amend the ambient air surrounding the horse using the horse lifter.

Other Preferred Embodiment

Figure 16:
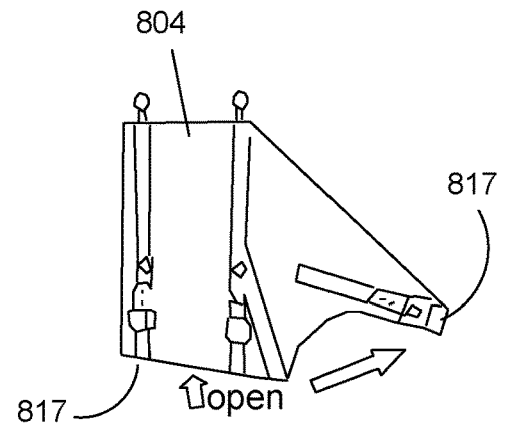
FIGS. 15-16 show a preferred girth lift blanket.
Figure 15:
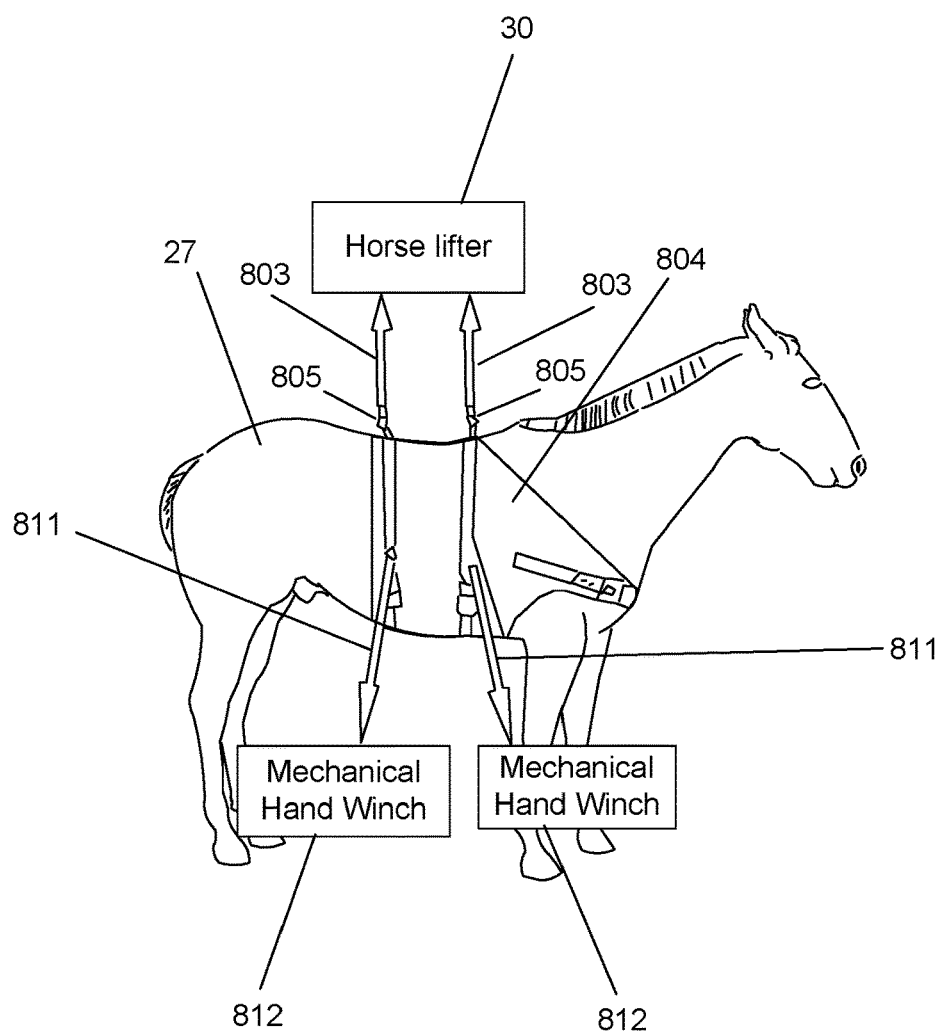

FIG. 15 shows a preferred girth lift blanket 804 attached to horse 27. Girth lift blanket 804 is open at its bottom and at its front where the buckles are placed (FIG. 16). Straps 817 hold girth blanket closed and secure on horse 27.

Two lift straps 803 extend upwards from girth lift blanket 804 and connect to the top of horse lifter 30. Approximately 4 inches of slack is kept in straps 803. Girth lift blanket 804 covers the horse as shown and acts to prevent the horse from falling in case one or more of the leg harnesses or leg harness lifting straps fails. Lift straps 803 connect to metal rings 805 at the crest of the back of horse 27.

Two down straps 811 on each side of girth lift blanket 804 are provided for additional safety and stability. Each down strap 811 connects to girth lift blanket 804 as shown and also to containment stall 14 (FIG. 6) via ratchet type hand mechanical winches 812. Mechanical hand winch 812 may be used to tighten or loosen down strap 811 as needed to control horse 27. Down straps 811 make it easier to keep horse 27 from rearing up as it gets used to containment in horse lifter 30.

The features shown in FIGS. 15 and 16 address two problems. First, the girth lift blanket 804 stays on the horse probably for the duration of its rehabilitation. Down straps 811 can be made taut with mechanical hand ratchet winches 812. This would take the place of the many straps that might be needed as the horse first wakes up connected to horse lifter 30 for the first time. If the horse is very calm to begin with and accepts the horse lifter calmly, down straps 811 can be loosened.

Second, the metal rings 805 on the top of girth lift blanket 804 are connected to horse lifter 30 via straps 803. Straps 803 have slack in them and do not support any weight except in an emergency, such as if one or more of the leg lift harnesses failed.

Improved Leg Harnesses to Prevent Chafing

Figure 17:
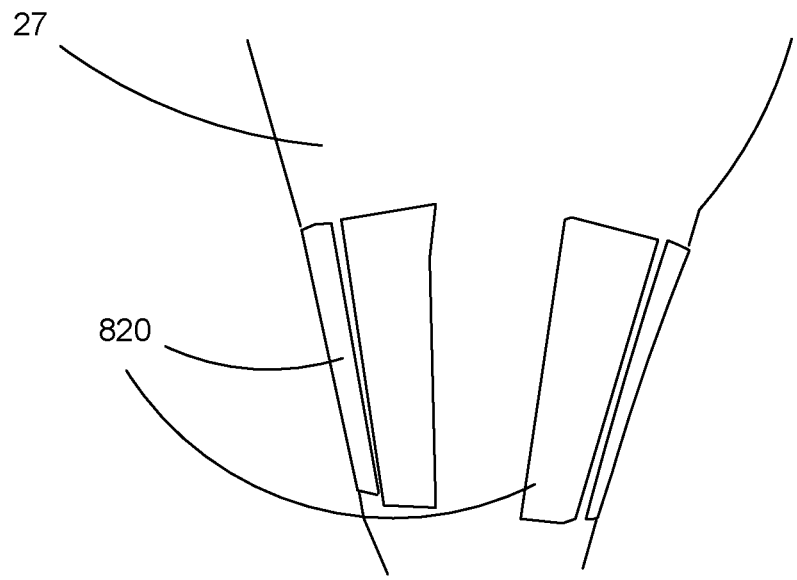
FIGS. 17-19 show preferred adhesive strips.

In another preferred embodiment adhesive strips 820 (FIG. 17) are adhered to the legs of horse 27. Adhesive strips 820 attach to the leg via an adhesive and include a hook and loop fastening mechanism (such as Velcro®) on the outside of the strips. Adhesive strips 820 are very tough and are porous to absorb medicine and allow air flow.

Figure 18:
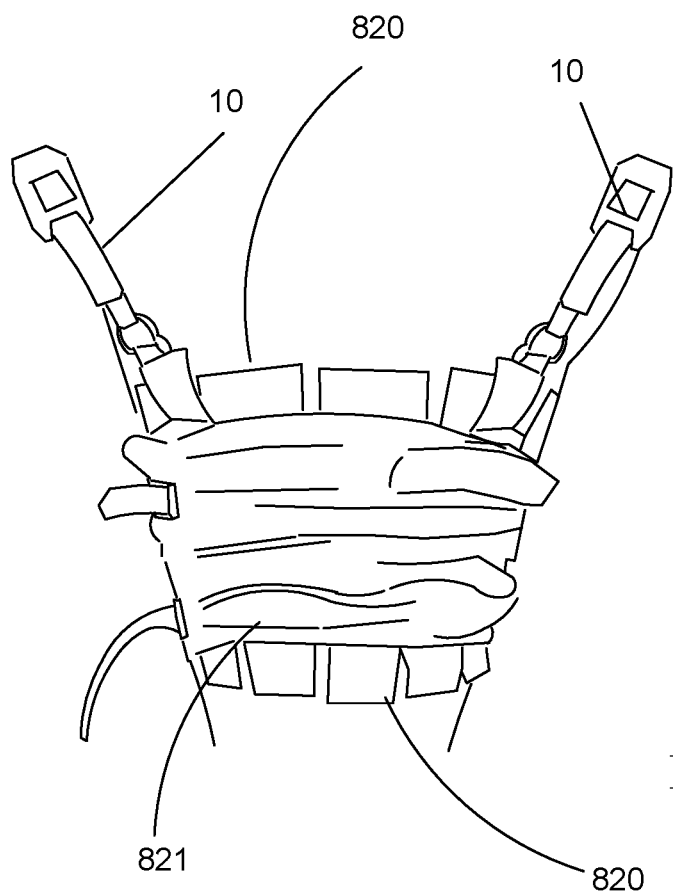

FIG. 18 shows lift harness 821 placed over the horse's right rear leg and locked in place over adhesive strips 820 via the Velcro® connection. Lifting straps 10 are attached to lift harness 821. The hook-and-loop fastener prevents harness 821 from moving relative to adhesive strips 820. This stops any motion that may cause abrasions or chafing against the horse's skin.

Figure 19:
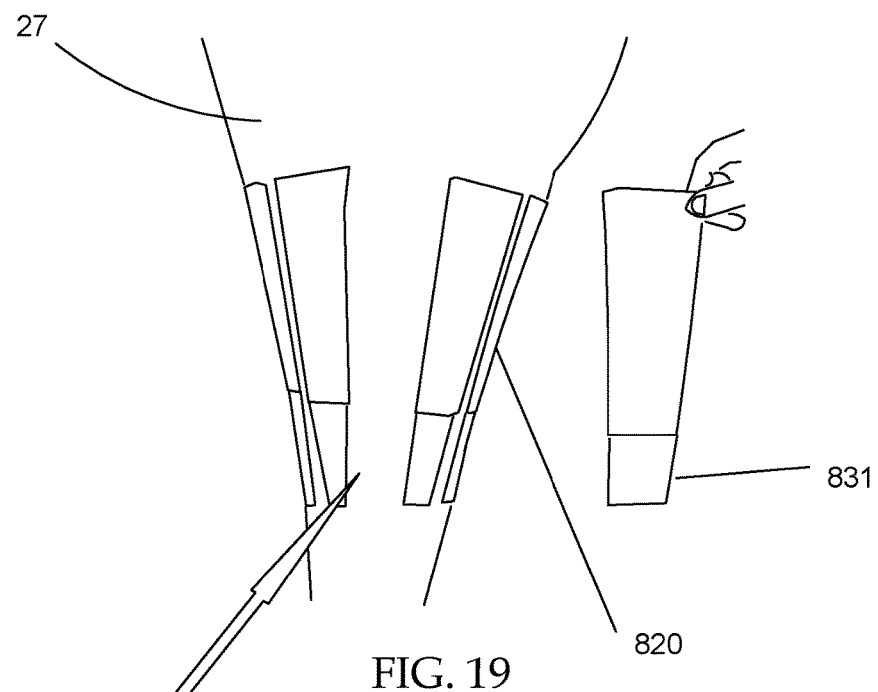
Figure 20:
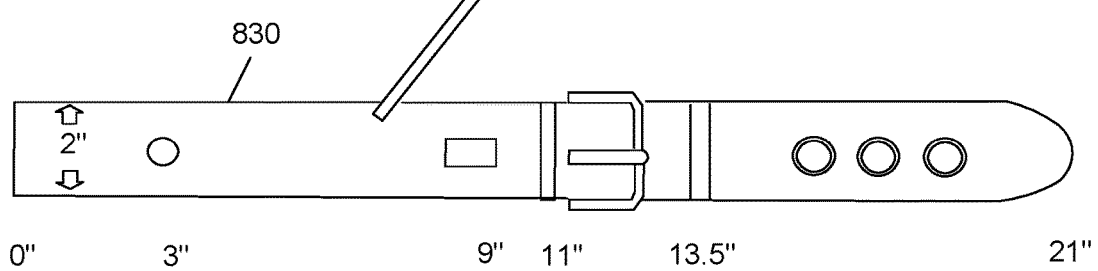
FIG. 20 shows a preferred wrap.

FIGS. 19-20 show wrap 830. Wrap 830 is preferably fabricated from 2-inch-wide webbing for 0-11 inches and fabricated from leather from 11-21 inches. Wrap 830 fits over the lower 2-inch extension 831 of adhesive strips 820 starting at the 0-inch mark at the middle of the horse's front part of its leg and going right (assuming a 6-inch leg circumference at this point on the leg). At the 3-inch mark is ½ the circumference with where lifting strap 10 will connect. At the 9-inch mark wrap 830 goes directly over lifting strap 10 and lifting strap 10 pulls through the opening. Velcro® fits on the front and back of wrap 830 from the 0 to 11-inch mark. The back of wrap 830 Velcro® sticks adhesive strips 820 on the first wrap around and then onto the front of wrap 830 itself. The rounded end goes under at the 13.5-inch mark and then into the buckle and then has "p" fed into an eyelet. The end then feed under the next loop and is turned back to re-loop at the 13.5-inch mark.

Each leg circumference requires the specific length of wrap 830 preferably at 1-inch increments. For example, the length of wrap 830 is adjusted at the 6-inch, the 7-inch, the 8-inch, the 9-inch leg circumferences, as appropriate.

Spreader Straps

Figure 21:
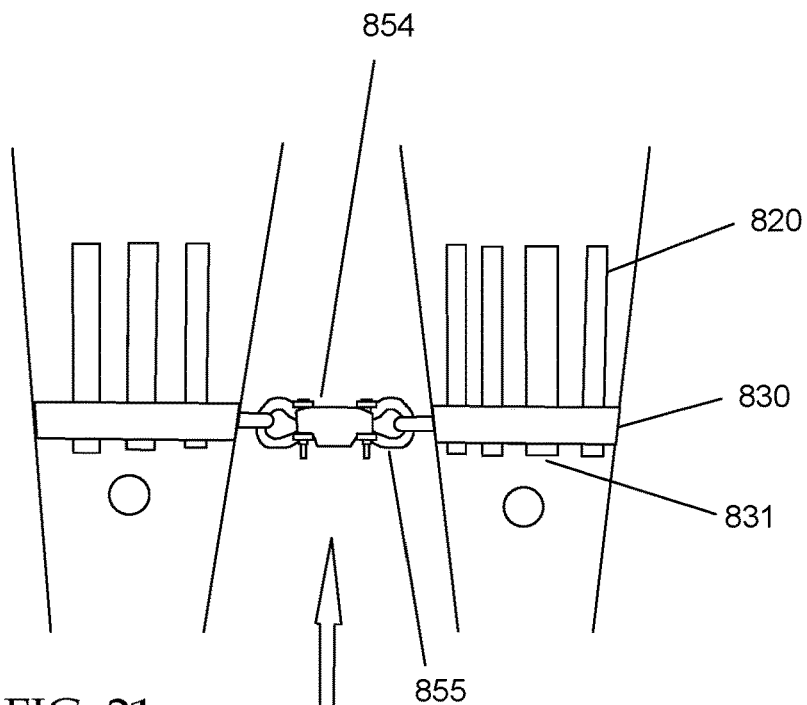
FIGS. 21-23 show a preferred spreader strap.
Figure 22:
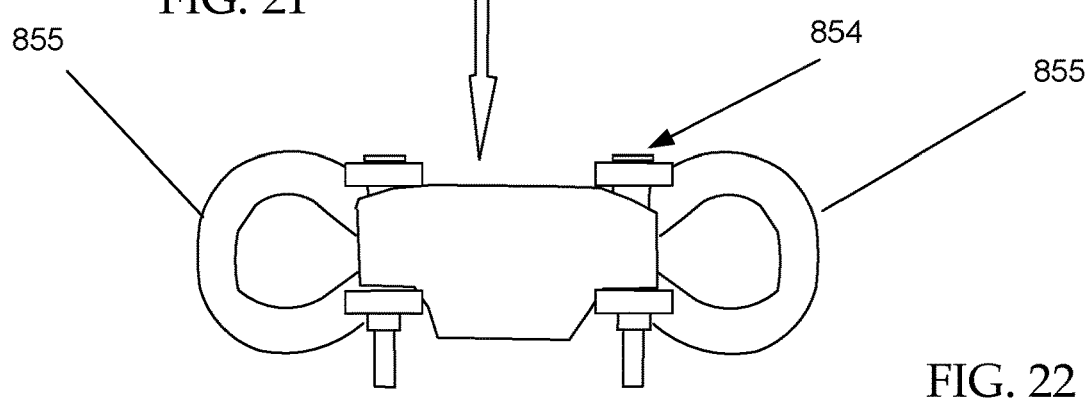
Figure 23:
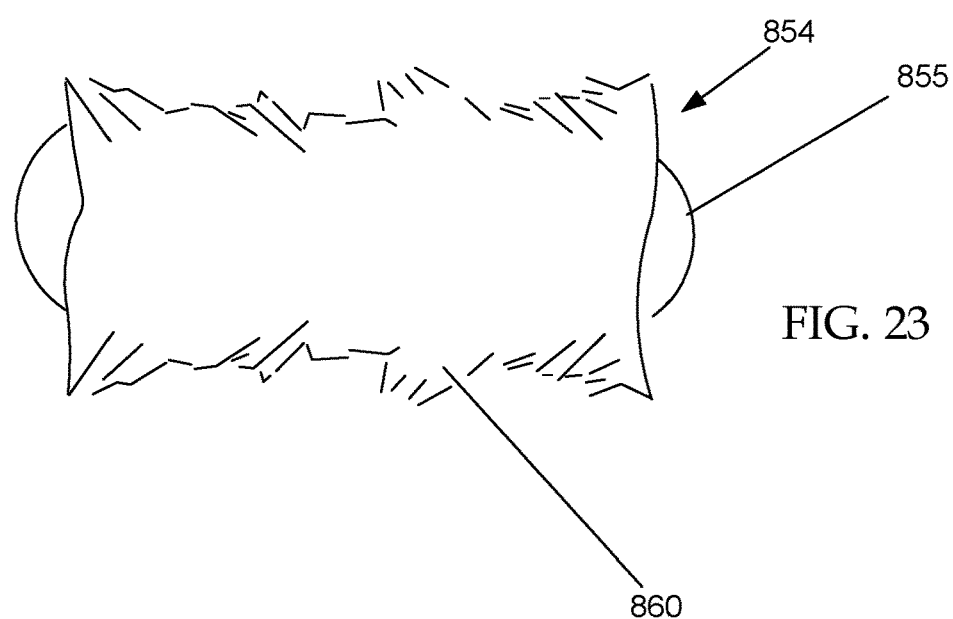

FIGS. 21-23 show the utilization of preferred spreader straps 854. In a preferred embodiment, 12-inch adhesive strips 820 are adhesively attached to the horse's legs as shown. Leg spreader wrap 830 (see above) is then wrapped around the adhesive straps 820 of each leg at the bottom 2-inch section 831.

Spreader strap 854 extends between each pair of the horse's legs to prevent the legs from spreading. Preferably, spreader strap 854 includes metal connectors 855 attached to two webbing loops. The total width is approximately 5 inches, in a preferred embodiment. Each horse may need a custom size for the length. Also, there may be slack in spreader strap 854 to facilitate ease of walking. As explained above, a preferred wrap 830 may be approximately 2-inch× 21-inch for a 6-inch leg circumference.

A spreader strap 854 may be short in length. Spreader strap 854 may be custom fit for each horse. For example, spreader strap 854 shown in FIG. 22 is approximately 4-inch long with ½-inch on either end with each webbing loop. In FIG. 23, padding 860 is utilized to cover spreader strap 854 to provide comfort to the horse. In a preferred embodiment padding 860 is sheepskin. There might be some horses with very large, low hanging penises. Padding 860 is utilized to protect these male horses from undue abrasions on their penises.

Although the above-preferred embodiments have been described with specificity, persons skilled in this art will recognize that many changes to the specific embodiments disclosed above could be made without departing from the spirit of the invention. For example, although the above embodiments each disclosed utilizing horse lifter 30 to lift a horse, it is understood that it could be similarly used to treat any four-legged, injured animal. It could also be used to treat a zebra, a camel, a gazelle, a giraffe, and many others. For example, ungulates may likewise be treated. Ungulates are any members of a diverse group of primarily large mammals that includes odd-toed ungulates such as horses and rhinoceroses, and even-toed ungulates such as cattle, pigs, giraffes, camels, deer, and hippopotami. Therefore, the attached claims and their legal equivalents should determine the scope of the invention.

What is claimed is:

1. A lifting system for a four-legged animal, comprising:
a lifting harness comprising:
  a pair of foreleg harnesses, each foreleg harness configured to be removably wrapped around a foreleg of the four-legged animal such that said foreleg harness is positioned substantially between the top of the knee joint and the bottom of the elbow joint;
  a pair of rear leg harnesses, each rear leg harness configured to be removably wrapped around a rear leg of the four-legged animal such that said rear leg harness is positioned substantially between the top of the hock joint and the bottom of the stifle joint; and
  a plurality of lifting straps, configured such that a respective pair of lifting straps of the plurality of lifting straps is connected to each of the foreleg and rear leg harnesses, each of the lifting straps having a proximal end, an intermediate portion, and a distal end;
    wherein the proximal end of each lifting strap of the pairs of lifting straps is respectively connected to a top portion of one of the foreleg or rear leg harnesses;
    wherein the distal end of each lifting strap of the pairs of lifting straps is connected to a respective strap guide corresponding to one of the forelegs or rear legs; and
    wherein the intermediate portion of each lifting strap of the pairs of lifting straps is connected to a respective spreader bar corresponding to one of the forelegs or rear legs, such that each lifting strap extends from the proximal end to the intermediate portion at an oblique angle relative to a vertical axis;
an overhead support structure configured to be positioned above the lifting harness, the overhead support structure comprising:
  a platform; and
  a plurality of winches positioned on an upper surface of the platform, wherein each winch comprises a wire winch line, and each wire winch line is configured to be connected at a distal end to one of the respective strap guides, whereby each winch is connected to a respective one of the foreleg or rear leg harnesses; and
a rotatable support structure, comprising:
  a rotatable disc;
  a support pole supported by the rotatable disc; and
  a horizontal beam supported by the support pole;
  wherein the overhead support structure is supported by the horizontal beam;
wherein during operation of the lifting system, when the four-legged animal is connected to the lifting harness, each winch is configured to exert a lifting force on a respective foreleg or rear leg via the respective foreleg or rear leg harness, thereby reducing the amount of weight carried by the four-legged animal on the respective foreleg or rear leg;
wherein the plurality of winches are configured to cooperate to support the four-legged animal so as to reduce the overall body weight carried by the four-legged animal;
wherein the rotatable support structure is configured to allow the four-legged animal, when connected to the lifting harness, to walk around the support pole with the reduced overall body weight.

2. The lifting system of claim 1, further comprising: a plurality of scales, each scale configured to be connected to a respective wire winch line so as to measure an amount of weight or tension on the respective wire winch line resulting from the lifting force exerted by the respective winch.

3. The lifting system of claim 1, further comprising: wherein the overhead support structure is supported by an end of the horizontal beam, wherein the rotatable support structure further comprises a counterweight supported on an opposing end of the horizontal beam, wherein the counterweight is configured to at least partially balance the weight of the four-legged animal during operation of the lifting system.

4. The lifting system of claim 1, further comprising: a pair of underbody connection straps, wherein each underbody connection strap is configured to be connected to a respective pair of the foreleg or rear leg harnesses, whereby each underbody connection strap is configured to prevent a respective pair of forelegs or rear legs of the four-legged animal from spreading during operation of the lifting system.

* * * * *